United States Patent
Suzuki

(10) Patent No.: US 11,955,874 B2
(45) Date of Patent: Apr. 9, 2024

(54) ELECTRIC POWERED WORK MACHINE

(71) Applicant: MAKITA CORPORATION, Anjo (JP)

(72) Inventor: Hitoshi Suzuki, Anjo (JP)

(73) Assignee: MAKITA CORPORATION, Anjo (JP)

( * ) Notice: Subject to any disclaimer, the term of this patent is extended or adjusted under 35 U.S.C. 154(b) by 364 days.

(21) Appl. No.: 17/615,376

(22) PCT Filed: Apr. 24, 2020

(86) PCT No.: PCT/JP2020/017743
§ 371 (c)(1),
(2) Date: Nov. 30, 2021

(87) PCT Pub. No.: WO2020/241140
PCT Pub. Date: Dec. 3, 2020

(65) Prior Publication Data
US 2022/0231576 A1    Jul. 21, 2022

(30) Foreign Application Priority Data

May 31, 2019   (JP) ................. 2019-102667

(51) Int. Cl.
*H02K 7/14*   (2006.01)
*B25F 5/00*   (2006.01)
*H02P 27/06*  (2006.01)

(52) U.S. Cl.
CPC .......... *H02K 7/145* (2013.01); *B25F 5/00* (2013.01); *H02P 27/06* (2013.01)

(58) Field of Classification Search
CPC .. H02K 7/145; H02K 7/14; B25F 5/00; H02P 27/06; H02P 25/03; H02P 29/024
USPC .............................. 361/23, 86–87
See application file for complete search history.

(56) References Cited

U.S. PATENT DOCUMENTS

2007/0046274 A1   3/2007  Matsuoka
2010/0079093 A1   4/2010  Kitanaka
(Continued)

FOREIGN PATENT DOCUMENTS

CN    102340280 A    2/2012
CN    104660121 A    5/2015
(Continued)

OTHER PUBLICATIONS

Apr. 15, 2023 Office Action issued in Chinese Patent Application No. 202080039843.6.
(Continued)

*Primary Examiner* — Danny Nguyen
(74) *Attorney, Agent, or Firm* — Oliff PLC

(57) ABSTRACT

An electric powered work machine includes an inverter circuit, a power-source-side switching element, a power-source-side resistor, at least one circuit-side resistor, and a fault determiner. The power-source-side switching element is arranged between a direct-current power source and the inverter circuit. The power-source-side resistor is connected in parallel to the power-source-side switching element. The circuit-side resistor is connected to the inverter circuit in such a state that electrical conduction is possible between a positive side and a negative side of the direct-current power source in the inverter circuit in a case where semiconductor switching elements in the inverter circuit are all OFF. The fault determiner determines whether the switching elements are short-circuited based on a voltage at a connection point between the power-source-side switching element and the inverter circuit.

11 Claims, 13 Drawing Sheets

(56) References Cited

U.S. PATENT DOCUMENTS

| | | | |
|---|---|---|---|
| 2010/0263960 A1* | 10/2010 | Nagase | B62D 5/0481 |
| | | | 180/443 |
| 2011/0156626 A1 | 6/2011 | Mukai et al. | |
| 2012/0013283 A1 | 1/2012 | Tallam et al. | |
| 2013/0314007 A1 | 11/2013 | Yanagihara et al. | |
| 2015/0137717 A1 | 5/2015 | Ishikawa et al. | |
| 2018/0034388 A1 | 2/2018 | Kawai et al. | |
| 2018/0203068 A1 | 7/2018 | Park | |
| 2019/0210640 A1* | 7/2019 | Ohashi | H02P 29/024 |

FOREIGN PATENT DOCUMENTS

| | | |
|---|---|---|
| CN | 107666238 A | 2/2018 |
| CN | 108336942 A | 7/2018 |
| JP | 2002-272177 A | 9/2002 |
| JP | 2007-060762 A | 3/2007 |
| JP | 2011-135692 A | 7/2011 |
| JP | 2015-089294 A | 5/2015 |
| JP | 5798134 B2 | 10/2015 |
| JP | 2017-163714 A | 9/2017 |

OTHER PUBLICATIONS

Jun. 30, 2020 International Search Report issued in International Patent Application No. PCT/JP2020/017743.

Jun. 30, 2020 Written Opinion of the International Searching Authority issued in International Patent Application No. PCT/JP2020/017743.

* cited by examiner

ELECTRIC POWERED WORK MACHINE

CROSS-REFERENCE TO RELATED APPLICATION

This international application claims the benefit of Japanese Patent Application No. 2019-102667 filed on May 31, 2019 with the Japan Patent Office, and the entire disclosure of Japanese Patent Application No. 2019-102667 is incorporated in this international application by reference.

TECHNICAL FIELD

The present disclosure relates to an electric powered work machine including a brushless motor as a power source.

BACKGROUND ART

Patent Document 1 describes an electric powered work machine in which a power supply switching element to control power supply to an inverter circuit that drives a motor is connected in series to a motor driver and in which a connection point between the three-phase inverter circuit and the power supply switching element is pulled up to 5 V.

PRIOR ART DOCUMENTS

Patent Documents

Patent Document 1: Japanese Patent No. 5798134

SUMMARY OF THE INVENTION

Problems to be Solved by the Invention

In the electric powered work machine described in Patent Document 1, a fault diagnosis of the power supply switching element is performed by measuring a voltage at the above-described connection point at the time when the power supply switching element is turned OFF. However, in the electric powered work machine described in Patent Document 1, it cannot be determined whether a short-circuit fault is occurring in switching elements constituting the inverter circuit. If the motor is driven in such a state that a short-circuit fault is occurring in the switching elements constituting the inverter circuit, a power-supply short-circuit current may flow, thus causing a risk of applying stress to a battery.

The present disclosure allows for detection of a short-circuit fault in switching elements, in an electric powered work machine.

Means for Solving the Problems

One aspect of the present disclosure is an electric powered work machine including a brushless motor as a power source, and the electric powered work machine includes an inverter circuit, a power-source-side switching element, a power-source-side resistor, at least one circuit-side resistor, and a fault determiner.

The inverter circuit includes semiconductor switching elements arranged on corresponding first current paths between a direct-current power source and the brushless motor, and is configured to control current flow to the brushless motor via the semiconductor switching elements.

The power-source-side switching element is arranged on a second current path between the direct-current power source and the inverter circuit.

The power-source-side resistor is connected in parallel to the power-source-side switching element.

The at least one circuit-side resistor is connected to the inverter circuit in such a state that electrical conduction is possible between a positive side and a negative side of the direct-current power source in the inverter circuit in a case where all of the semiconductor switching elements in the inverter circuit are OFF.

The fault determiner is configured to turn OFF the power-source-side switching element and all of the semiconductor switching elements and to determine whether at least one of "the semiconductor switching elements and the power-source-side switching element" is short-circuited based on a connection-point voltage at a connection point between the power-source-side switching element and the inverter circuit.

In the thus-configured electric powered work machine of the present disclosure, the at least one circuit-side resistor is connected to the inverter circuit in such a state that electrical conduction is possible between the positive side and the negative side of the direct-current power source in the inverter circuit. Thus, if at least one of the semiconductor switching elements is short-circuited in the inverter circuit, the connection-point voltage changes. On the other hand, the power-source-side resistor is connected in parallel to the power-source-side switching element. Thus, if the power-source-side switching element is short-circuited, the connection-point voltage changes. Further, the connection-point voltage differs between the case in which at least one of the semiconductor switching elements is short-circuited and the case in which the power-source-side switching element is short-circuited.

This makes it possible, in the electric powered work machine of the present disclosure, to detect whether at least one of the semiconductor switching elements is short-circuited and whether the power-source-side switching element is short-circuited.

In one aspect of the present disclosure, specifically, the at least one circuit-side resistor may be connected in parallel to at least one of high-side switching elements, and may be connected in parallel to at least one of low-side switching elements. From among the semiconductor switching elements, the high-side switching elements are the semiconductor switching elements arranged on the corresponding first current paths between the brushless motor and a positive electrode of the direct-current power source. The low-side switching elements are the semiconductor switching elements arranged on the corresponding first current paths between the brushless motor and a negative electrode of the direct-current power source.

In one aspect of the present disclosure, the fault determiner may be configured to determine that at least one of the semiconductor switching elements is short-circuited if the connection-point voltage is smaller than or equal to a fault determination voltage, which is set in advance so as to indicate the connection-point voltage at a time of occurrence of a short-circuit fault in one of the semiconductor switching elements. This makes it possible, in the electric powered work machine of the present disclosure, to determine whether at least one of the semiconductor switching elements is short-circuited by a simple method in which the connection-point voltage is compared with the fault determination voltage.

In one aspect of the present disclosure, the fault determiner may be configured to determine that the power-source-side switching element is short-circuited if the connection-point voltage is larger than or equal to a power-source-side fault determination voltage, which is set in advance so as to indicate the connection-point voltage at a time of occurrence of a short-circuit fault in the power-source-side switching element. This makes it possible, in the electric powered work machine of the present disclosure, to determine whether the power-source-side switching element is short-circuited by a simple method in which the connection-point voltage is compared with the power-source-side fault determination voltage.

In one aspect of the present disclosure, a short-circuit notifier and a power-supply interrupter may be provided. The short-circuit notifier is configured, if the fault determiner determines that at least one of "the semiconductor switching elements and the power-source-side switching element" is short-circuited, to notify accordingly. The power-supply interrupter is configured to turn OFF all of the semiconductor switching elements and the power-source-side switching element if an operation switch to be operated to activate the electric powered work machine is in an ON state in a case where the fault determiner determines that at least one of "the semiconductor switching elements and the power-source-side switching element" is short-circuited. This makes it possible, in the electric powered work machine of the present disclosure, when at least one of "the semiconductor switching elements and the power-source-side switching element" is short-circuited, to make a user of the electric powered work machine aware of such a situation. In addition, in the electric powered work machine of the present disclosure, when at least one of "the semiconductor switching elements and the power-source-side switching element" is short-circuited, it is possible to inhibit occurrence of a situation in which a short-circuit current flows between the positive electrode and the negative electrode of the direct-current power source.

In one aspect of the present disclosure, a parallel switching element and an at-determination controller may be provided. The parallel switching element is connected in series to the power-source-side resistor and also connected in parallel to the power-source-side switching element. The at-determination controller is configured to turn ON the parallel switching element at a start of fault determination by the fault determiner. This makes it possible, in the electric powered work machine of the present disclosure, not to allow a current to flow through the power-source-side resistor except when the fault determiner performs the fault determination, thus reducing power consumption in the electric powered work machine of the present disclosure.

In one aspect of the present disclosure, resistance values of the power-source-side resistor and of the at least one circuit-side resistor may be equal to each other. This makes it possible, in the electric powered work machine of the present disclosure, to facilitate calculation of the connection-point voltage in the case where at least one of "the semiconductor switching elements and the power-source-side switching element" is short-circuited.

In one aspect of the present disclosure, a prohibitor configured to prohibit the fault determiner from performing the fault determination during rotation of the brushless motor may be provided. This makes it possible, in the electric powered work machine of the present disclosure, to inhibit occurrence of a situation in which the fault determiner performs the fault determination when an induced voltage resulting from rotation of the brushless motor is affecting the connection-point voltage, thus improving accuracy of the fault determination by the fault determiner.

In one aspect of the present disclosure, the fault determination voltage may be set to a value between: a normal-state lowest value, which is a lowest value of the connection-point voltage in a case where all of the semiconductor switching elements and the power-source-side switching element are each in a normal state; and a value of the connection-point voltage in a case where one of the semiconductor switching elements is short-circuited. This makes it possible, in the electric powered work machine of the present disclosure, to inhibit occurrence of a situation in which it is determined that at least one of the semiconductor switching elements is short-circuited despite the fact that none of the semiconductor switching elements is short-circuited, thus improving accuracy of the fault determination by the fault determiner.

In one aspect of the present disclosure, the normal-state lowest value may be a value in a case where a temperature of a negative-side element is higher than a temperature of a positive-side element. From among the inverter circuit and the power-source-side switching element that are elements constituting the electric powered work machine, the positive-side element is the element arranged closer to the positive electrode of the direct-current power source, on a current path from the positive electrode of the direct-current power source to the negative electrode of the direct-current power source. The negative-side element is the element arranged closer to the negative electrode of the direct-current power source. This makes it possible, in the electric powered work machine of the present disclosure, to inhibit occurrence of the situation in which it is determined that at least one of the semiconductor switching elements is short-circuited despite the fact that none of the semiconductor switching elements is short-circuited, thus further improving accuracy of the fault determination by the fault determiner.

EXPLANATION OF REFERENCE NUMERALS

1 . . . electric powered work machine, 11 . . . motor, 12 . . . battery, 21 . . . motor driver, 23 . . . control circuit, Pc . . . connection point, Q1-Q7 . . . switching element, R1-R7, R21 . . . resistor

MODE FOR CARRYING OUT THE INVENTION

First Embodiment

A first embodiment of the present disclosure will be described below with reference to the drawings.

Figure 1:
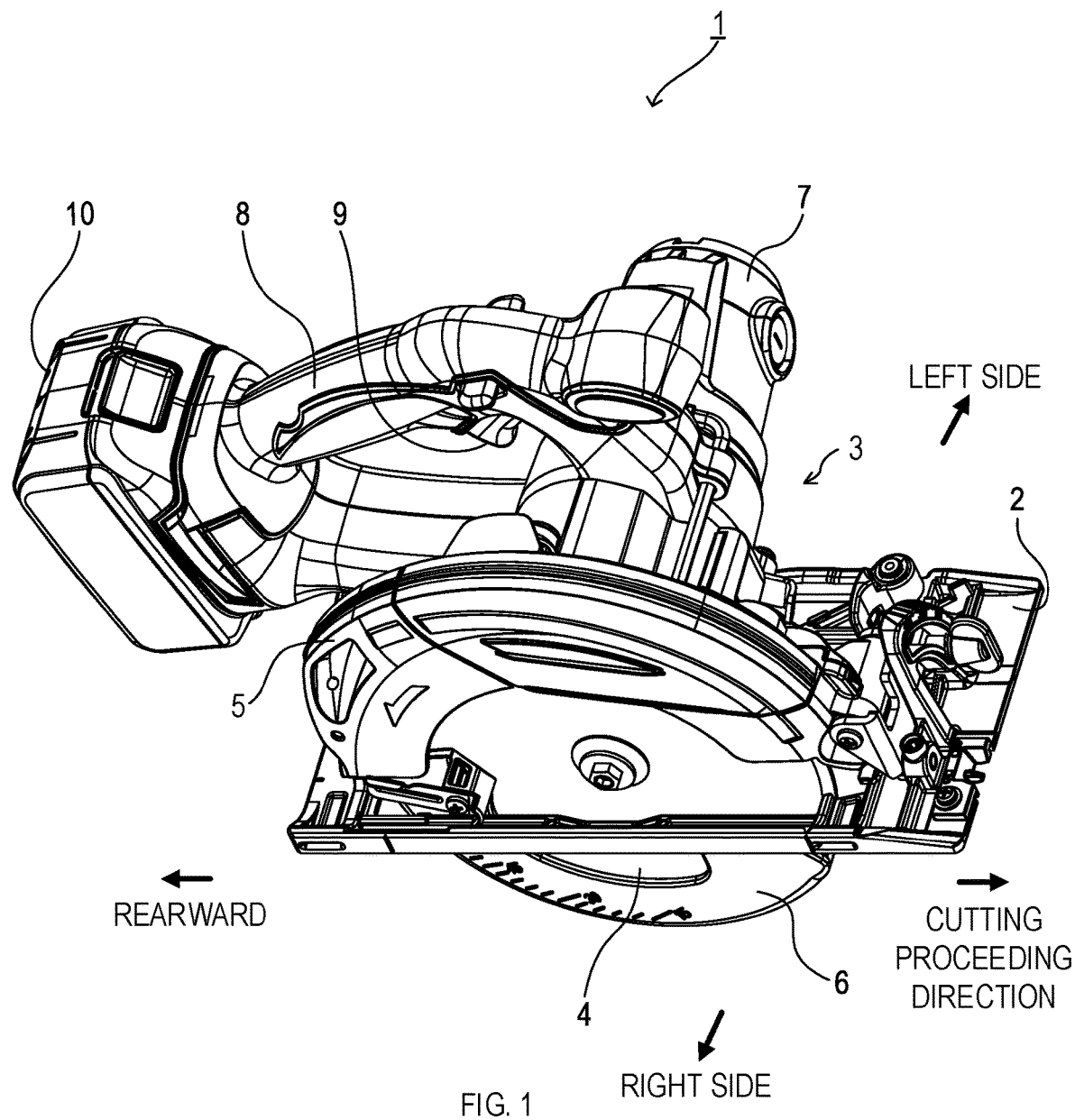
FIG. 1 is a perspective view showing an overall configuration of an electric powered work machine of a first embodiment.

As shown in FIG. 1, an electric powered work machine 1 of the present embodiment is a circular saw used mainly for the purpose of cutting a workpiece.

The electric powered work machine 1 includes a base 2 and a main body 3. The base 2 is a substantially rectangularly-shaped member that is in contact with an upper face of the workpiece to be cut when a workpiece cutting operation is performed. The main body 3 is arranged on an upper-face side of the base 2.

The main body 3 includes a saw blade 4 having a circular shape, a saw blade case 5, and a cover 6. The saw blade 4 is arranged on a right side of the main body 3 with respect to a cutting proceeding direction. The saw blade case 5 is formed so as to accommodate therein and cover a circumference of the saw blade 4 in a range of a substantially upper half thereof.

The cover 6 is formed so as to cover the circumference of the saw blade 4 in a range of a substantially lower half thereof. The cover 6 is openable and closable, and FIG. 1 shows a state in which the cover 6 is closed. By moving the electric powered work machine 1 in the cutting proceeding direction when cutting the workpiece, the cover 6 rotates about a center of rotation of the saw blade 4 in a counterclockwise direction viewed in FIG. 1, thus being opened gradually. This causes the saw blade 4 to be exposed, and the exposed part thereof cuts into the workpiece.

Arranged on a left side of the main body 3 is a motor case 7 having a substantially cylindrical shape. The motor case 7 accommodates therein a motor 11, which is a drive source for the electric powered work machine 1. The motor 11 is not shown in FIG. 1 but shown in FIG. 2.

A not-shown gear mechanism is accommodated between the motor case 7 and the saw blade 4. Upon rotation of the motor 11, the rotation is transmitted to the saw blade 4 via the gear mechanism, thus rotating the saw blade 4.

Arranged on an upper side of the main body 3 is a handle 8 to be gripped by a user of the electric powered work machine 1. The handle 8 is attached on the upper side of the main body 3 so as to have an arch-like shape. Specifically, one end of the handle 8 is fixed on a rear end side of the main body 3 with respect to the cutting proceeding direction, and the other end is fixed on a more forward side with respect to the cutting proceeding direction than the rear end side.

The handle 8 has a trigger switch 9 mounted thereon. The user of the electric powered work machine 1 can perform a pulling operation and a releasing operation to the trigger switch 9 while gripping the handle 8. The user of the electric powered work machine 1 can pull the trigger switch 9 in such a state that a lock-off lever protruding in left and right directions of the handle 8 in the vicinity of the trigger switch 9 is operated. Specifically, the user of the electric powered work machine 1 is enabled to pull the trigger switch 9 by pressing the lock-off lever from the left side or from the right side. Hereinafter, a state in which the pulling operation is performed to the trigger switch 9 is referred to as an ON state, and a state in which the releasing operation is performed to the trigger switch 9 is referred to as an OFF state.

A battery pack 10 containing therein a battery 12 that can be repeatedly charged is attached to a rear end of the main body 3 in an attachable and detachable manner. When the pulling operation is performed to the trigger switch 9 with the battery pack 10 attached to the main body 3, electric power of the battery 12 causes the motor 11 within the main body 3 to rotate. The battery 12 is not shown in FIG. 1 but shown in FIG. 2.

Figure 2:
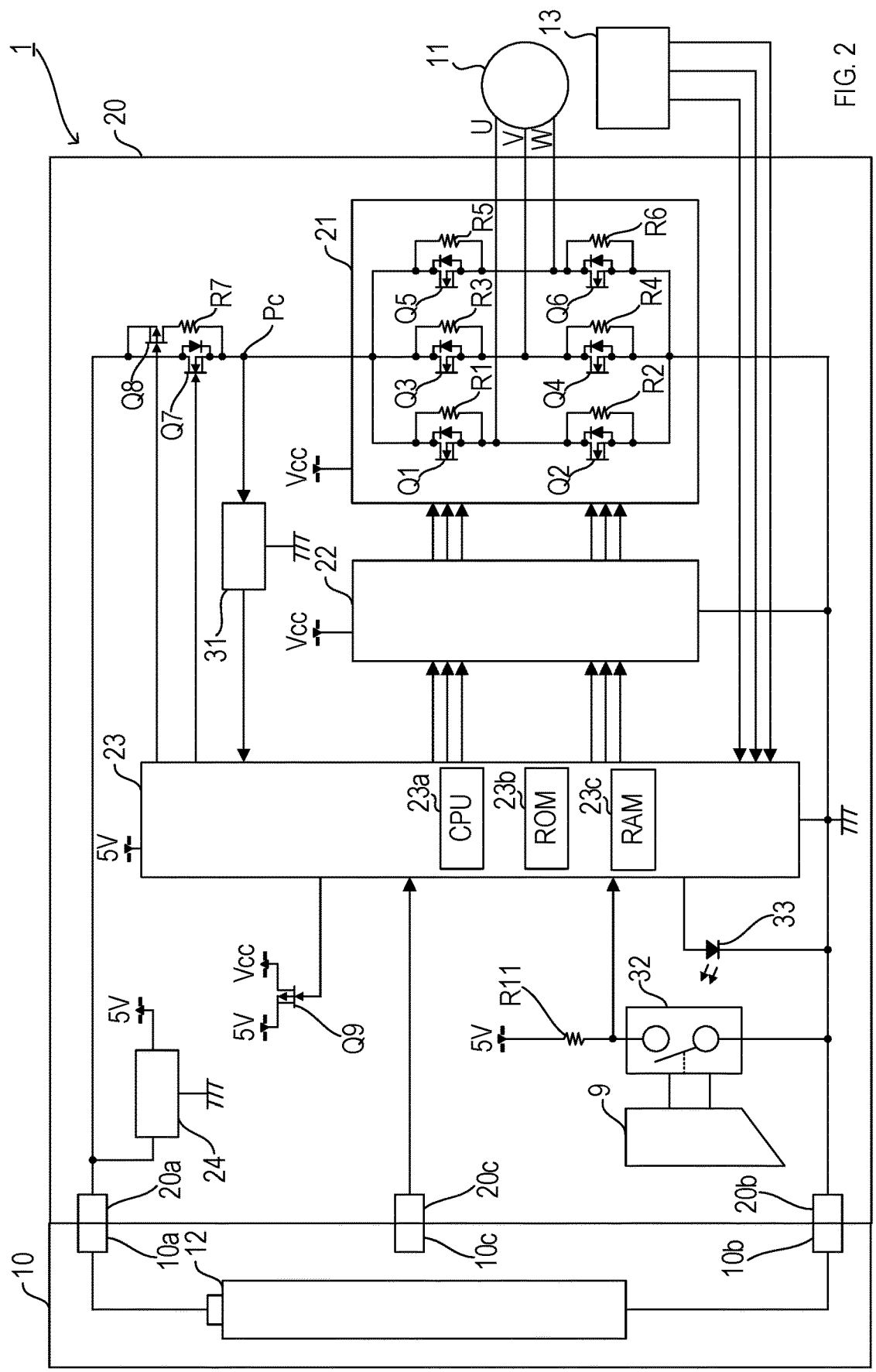
FIG. 2 is a block diagram showing an electrical configuration of the electric powered work machine of the first embodiment.

As shown in FIG. 2, the electric powered work machine 1 includes a control unit 20. The control unit 20 includes a power-supply terminal 20a, a ground terminal 20b, and a communication terminal 20c. Upon attachment of the battery pack 10 to the main body 3, the power-supply terminal 20a, the ground terminal 20b, and the communication terminal 20c are respectively connected to a power-supply terminal 10a, a ground terminal 10b, and a communication terminal 10c of the battery pack 10.

The power-supply terminal 10a of the battery pack 10 is connected to a positive electrode of the battery 12. The ground terminal 10b of the battery pack 10 is connected to a negative electrode of the battery 12. The battery pack 10 outputs a discharge permission signal or a discharge prohibition signal through the communication terminal 10c.

The control unit 20 receives power supply from the battery 12 within the battery pack 10, and controls drive of the motor 11. In the present embodiment, the motor 11 is a three-phase brushless motor.

The control unit 20 includes a motor driver 21, a gate driver 22, a control circuit 23, and a regulator 24.

The motor driver 21 is a circuit that receives power supply from the battery 12 to flow a current through windings of respective phases of the motor 11. In the present embodiment, the motor driver 21 is configured as a three-phase full-bridge circuit including six switching elements Q1, Q2, Q3, Q4, Q5, and Q6. In the present embodiment, the switching elements Q1 to Q6 are MOSFETs.

In the motor driver 21, the switching elements Q1, Q3, and Q5 are arranged on corresponding power-supply lines that connect, respectively, terminals U, V, and W of the motor 11 and the positive electrode of the battery 12. The switching elements Q2, Q4, and Q6 are arranged on corresponding ground lines that connect, respectively, the terminals U, V, and W of the motor 11 and the negative electrode of the battery 12.

The motor driver 21 includes resistors R1, R2, R3, R4, R5, and R6. The resistors R1, R2, R3, R4, R5, and R6 are respectively connected in parallel to the switching elements Q1, Q2, Q3, Q4, Q5, and Q6. Resistance values of the resistors R1, R2, R3, R4, R5, and R6 are equal to one another.

The gate driver 22 is a circuit that turns ON or OFF each of the switching elements Q1 to Q6 within the motor driver 21 in accordance with a control signal outputted from the control circuit 23 to thereby flow a current through the windings of respective phases of the motor 11, thus rotating the motor 11.

The control circuit 23 is configured mainly with a microcomputer including a CPU 23a, a ROM 23b, a RAM 23c, and so on. Various functions of the microcomputer are performed through execution, by the CPU 23a, of a program stored in a non-transitory tangible storage medium. In this example, the ROM 23b corresponds to the non-transitory tangible storage medium storing the program. Execution of this program causes processes corresponding to the program to be carried out. Part or all of the functions performed by the CPU 23a may be configured with hardware, such as one or more than one IC. The number of the microcomputer constituting the control circuit 23 may be one or more than one.

The regulator 24 receives power supply from the battery 12 via the power-supply terminal 20a, and generates a voltage of 5 V for causing the control circuit 23 to operate.

The control unit 20 includes switching elements Q7, Q8, and Q9, a resistor R7, and a voltage-dividing circuit 31. In the present embodiment, the switching elements Q7 to Q9 are MOSFETs.

A drain of the switching element Q7 is connected to the power-supply terminal 20a, a source thereof is connected to the motor driver 21, and a gate thereof is connected to the control circuit 23. The switching element Q8 is connected in parallel to the switching element Q7. One end of the resistor R7 is connected to a drain of the switching element Q8, and the other end is connected to the source of the switching element Q7. A resistance value of the resistor R7 is equal to the resistance values of the resistors R1 to R6.

The voltage-dividing circuit 31 outputs, to the control circuit 23, a divided voltage obtained by dividing a connection-point voltage at a connection point Pc between the switching element Q7 and the motor driver 21.

The voltage of 5 V from the regulator 24 is applied to a source of the switching element Q9, and a drain of the switching element Q9 is connected to the motor driver 21 and to the gate driver 22. A gate of the switching element Q9 is connected to the control circuit 23, and the switching element Q9 is turned ON or OFF in accordance with a voltage level of a control signal from the control circuit 23. When the switching element Q9 is ON, the voltage of 5 V from the regulator 24 is supplied to the motor driver 21 and to the gate driver 22 as a power-supply voltage Vcc. When the switching element Q9 is OFF, supply of the power-supply voltage Vcc to the motor driver 21 and to the gate driver 22 is interrupted.

The control unit 20 includes a switch 32 and a light emitting diode 33. The voltage of 5 V from the regulator 24 is applied to one end of the switch 32 via a resistor R11, and the other end of the switch 32 is grounded. The switch 32 is turned ON upon the pulling operation to the trigger switch 9 by the user of the electric powered work machine 1, and is turned OFF upon the releasing operation to the trigger switch 9 by the user of the electric powered work machine 1. The one end of the switch 32 is connected to the control circuit 23, and a voltage at the one end of the switch 32 is detected by the control circuit 23.

An anode of the light emitting diode 33 is connected to the control circuit 23, and a cathode thereof is grounded. The light emitting diode 33 emits light when an error display signal is outputted from the control circuit 23.

Further, the electric powered work machine 1 includes a rotation sensor 13. The rotation sensor 13 detects a rotational position and a rotational speed of the motor 11, and outputs a detection signal indicating the result of detection to the control circuit 23.

Next, an explanation will be given of procedures of a work machine control process performed by the CPU 23a in the control circuit 23. The work machine control process is a process started after the voltage of 5 V is supplied to the control circuit 23 to start the control circuit 23.

Figure 3:
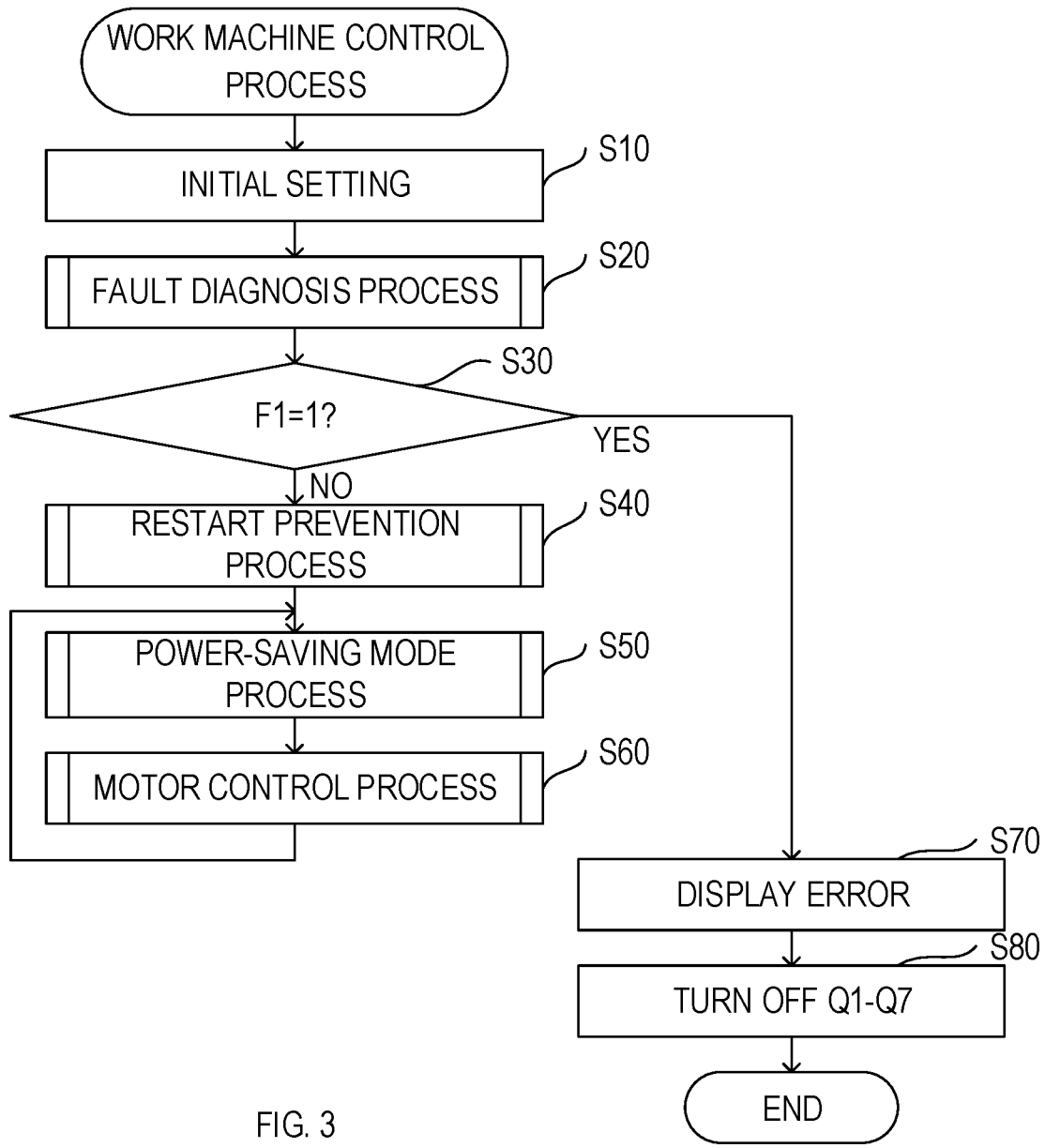
FIG. 3 is a flowchart showing a work machine control process.

When performing the work machine control process, as shown in FIG. 3, the CPU 23a first performs an initial setting in S10. Specifically, the CPU 23a sets various parameters used in the work machine control process to initial values, and switches the switching element Q9 from OFF to ON.

Subsequently, in S20, the CPU 23a performs a fault diagnosis process to be described below. Then, in S30, the CPU 23a determines whether a fault flag F1 provided in the RAM 23c is set. In the descriptions below, setting a flag refers to setting a value of the flag to 1, and clearing a flag refers to setting a value of the flag to 0.

Here, if the fault flag F1 is not set, the CPU 23a performs, in S40, a restart prevention process to be described below. Then, in S50, the CPU 23a performs a power-saving mode process to be described below. Further, in S60, the CPU 23a performs a motor control process to be described below, and shifts to S50.

If the fault flag F1 is set in S30, the CPU 23a outputs, in S70, the error display signal to the light emitting diode 33 to cause the light emitting diode 33 to emit light. In this way, the electric powered work machine 1 displays a notification that a fault has occurred in the electric powered work machine 1. Subsequently, in S80, the CPU 23a turns OFF the switching elements Q1 to Q7, and ends the work machine control process.

Next, an explanation will be given of procedures of the fault diagnosis process performed by the CPU 23a in S20.

Figure 4:
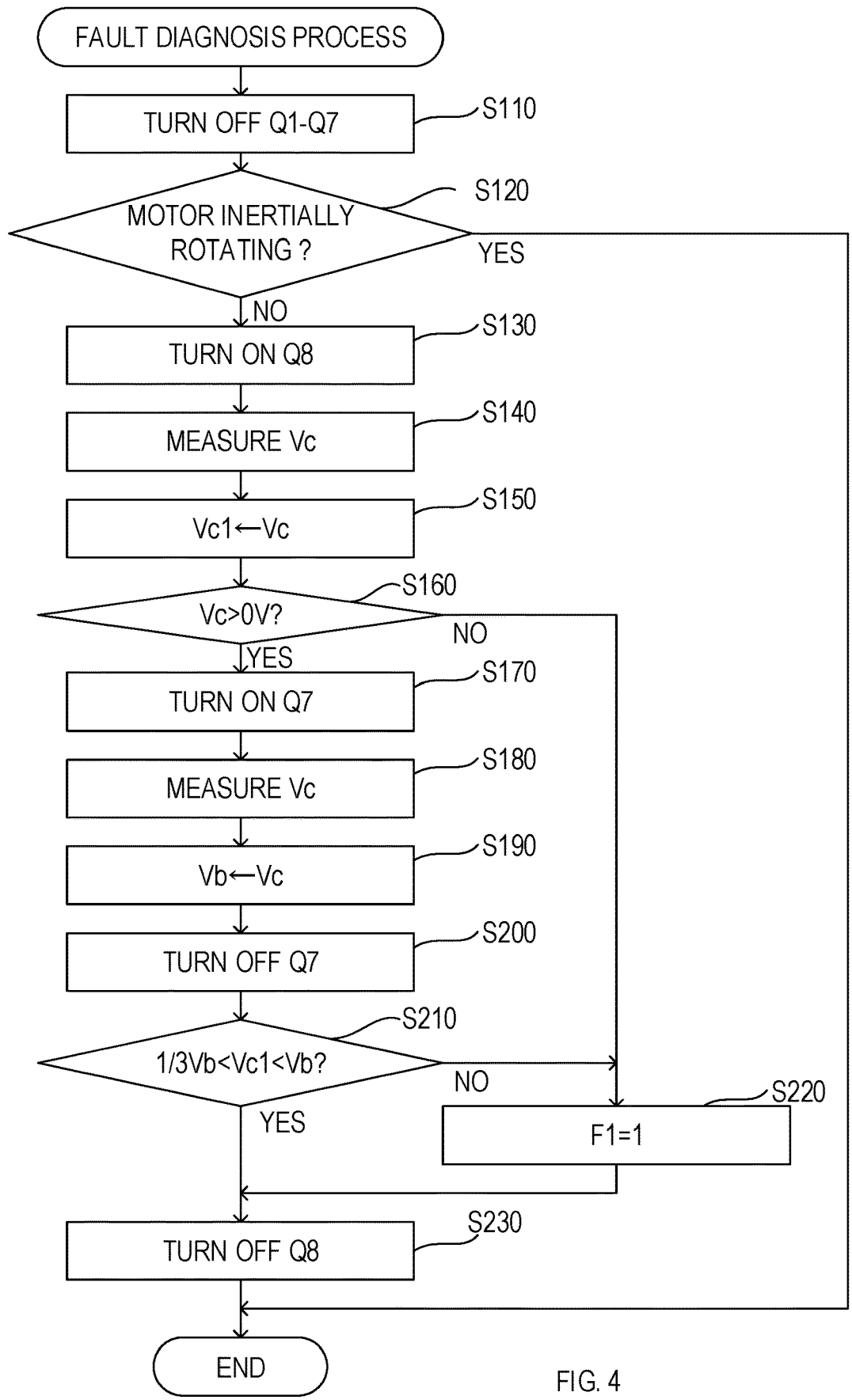
FIG. 4 is a flowchart showing a fault diagnosis process of the first embodiment.

When performing the fault diagnosis process, as shown in FIG. 4, the CPU 23a first turns OFF the switching elements Q1 to Q7 in S110.

Then, in S120, the CPU 23a determines whether the motor 11 is inertially rotating based on the detection signal from the rotation sensor 13. Here, if the motor 11 is inertially rotating, the CPU 23a ends the fault diagnosis process. By contrast, if the motor 11 is not inertially rotating, the CPU 23a turns ON the switching element Q8 in S130.

Then, in S140, the CPU 23a measures the connection-point voltage based on the divided voltage from the voltage-dividing circuit 31, and stores the value of the measured voltage in a connection-point voltage Vc provided in the RAM 23c.

Further, in S150, the CPU 23a stores the value stored in the connection-point voltage Vc in a connection-point voltage Vc1 provided in the RAM 23c.

In S160, the CPU 23a determines whether the connection-point voltage Vc is larger than 0 V. If an arm short-circuit fault is occurring in the motor driver 21, the connection-point voltage Vc becomes 0 V. By contrast, if an arm short-circuit fault is not occurring in the motor driver 21 and also the switching elements Q1 to Q6 are turned OFF, the connection-point voltage Vc does not become 0 V even when the switching element Q7 is turned ON.

Here, if the connection-point voltage Vc is smaller than or equal to 0 V, the CPU 23a shifts to S220. By contrast, if the connection-point voltage Vc is larger than 0 V, the CPU 23a turns ON the switching element Q7 in S170. Then, in S180, the CPU 23a measures the connection-point voltage based on the divided voltage from the voltage-dividing circuit 31, and stores the value of the measured voltage in the connection-point voltage Vc.

Further, in S190, the CPU 23a stores the value stored in the connection-point voltage Vc in a battery voltage Vb provided in the RAM 23c. After that, the CPU 23a turns OFF the switching element Q7 in S200.

Then, in S210, the CPU 23a determines whether the value stored in the connection-point voltage Vc1 is larger than one third of the value stored in the battery voltage Vb and also smaller than the value stored in the battery voltage Vb. That is, the CPU 23a determines whether $(\frac{1}{3}) \times Vb < Vc1 < Vb$ is satisfied.

Given that drain-to-source resistances of the switching elements Q1 to Q7 at the time when the switching elements Q1 to Q7 are OFF are sufficiently larger than resistances of the resistors R1 to R7 and can be ignored, the connection-point voltage in a case of no occurrence of short circuit in the switching elements Q1 to Q7 is calculated to be $(\frac{2}{3}) \times Vb$. The connection-point voltage in a case of occurrence of short circuit in any one of the switching elements Q1 to Q6 is calculated to be $(\frac{1}{3}) \times Vb$. The connection-point voltage in a case of occurrence of short circuit in the switching element Q7 is calculated to be Vb. Accordingly, if the connection-point voltage is equal to Vb or is smaller than or equal to $(\frac{1}{3}) \times Vb$, it can be determined that short circuit is occurring in at least one of the switching elements Q1 to Q7.

Here, if the value stored in the connection-point voltage Vc1 is smaller than or equal to one third of the value stored in the battery voltage Vb, or is larger than or equal to the value stored in the battery voltage Vb, the CPU 23a shifts to S220.

Upon shifting to S220, the CPU 23a sets the fault flag F1, and shifts to S230.

In S210, if the value stored in the connection-point voltage Vc1 is larger than one third of the value stored in the battery voltage Vb and also smaller than the value stored in the battery voltage Vb, the CPU 23a shifts to S230.

Upon shifting to S230, the CPU 23a turns OFF the switching element Q8, and ends the fault diagnosis process.

Next, an explanation will be given of procedures of the restart prevention process performed by the CPU 23a in S40.

Figure 5:
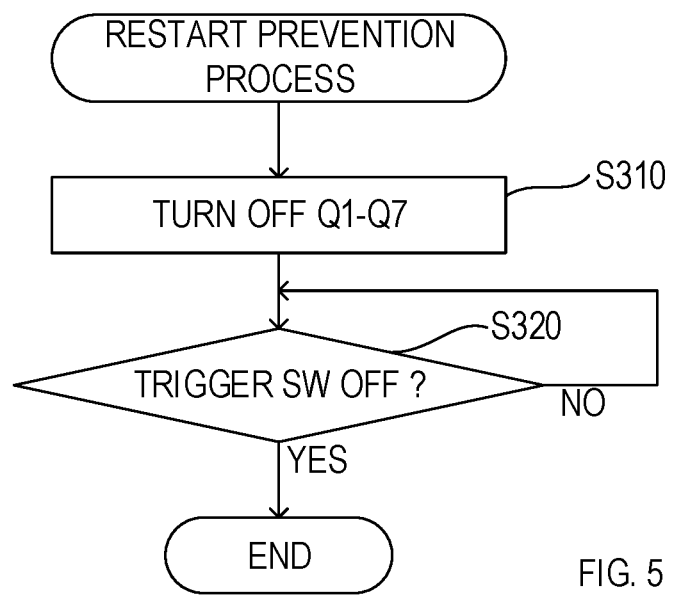
FIG. 5 is a flowchart showing a restart prevention process.

When performing the restart prevention process, as shown in FIG. 5, the CPU 23a first turns OFF the switching elements Q1 to Q7 in S310.

Then, in S320, the CPU 23a determines whether the trigger switch 9 is in the OFF state. Here, if the trigger switch 9 is in the ON state, the CPU 23a repeats the procedure of S320, thus waiting until the trigger switch 9 enters the OFF state.

Upon the trigger switch 9 entering the OFF state, the CPU 23a ends the restart prevention process.

Next, an explanation will be given of procedures of the power-saving mode process performed by the CPU 23a in S50.

Figure 6:
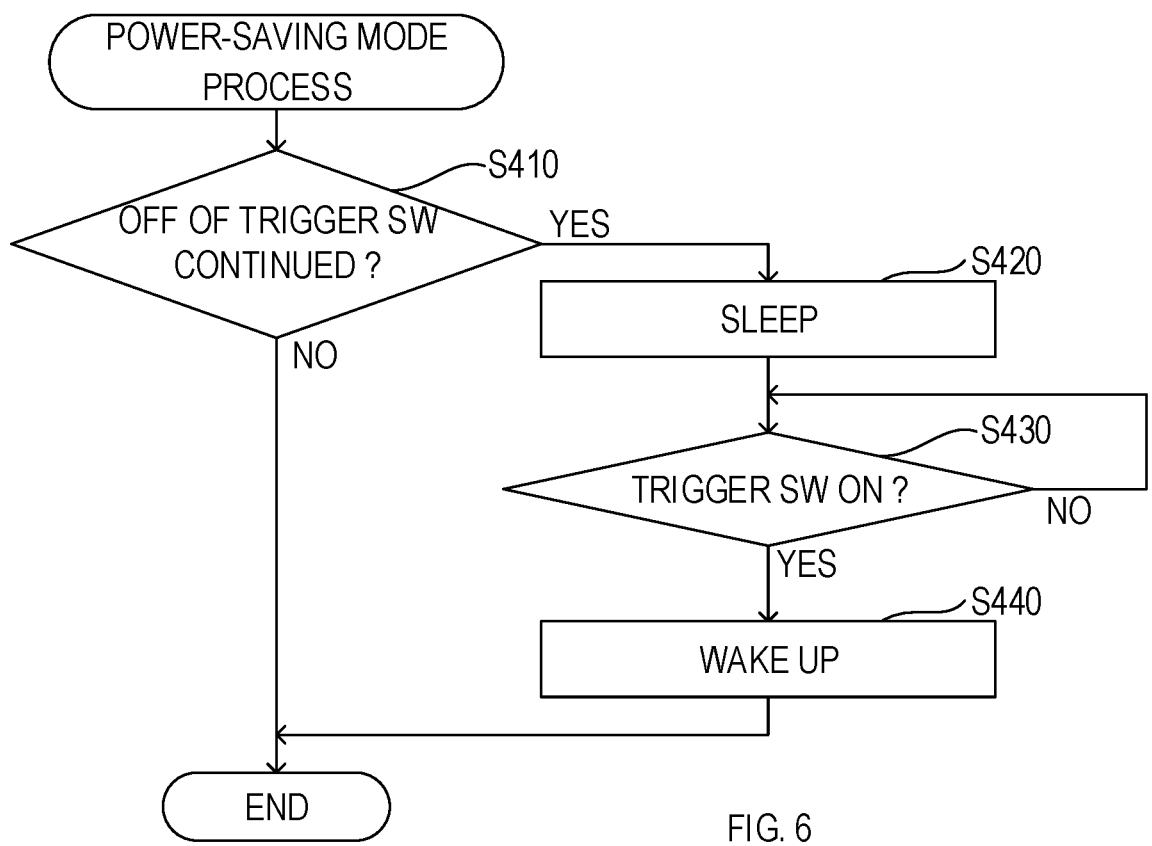
FIG. 6 is a flowchart showing a power-saving mode process.

When performing the power-saving mode process, as shown in FIG. 6, the CPU 23a first determines, in S410, whether the OFF state of the trigger switch 9 has continued for a mode determination period set in advance. Here, if the OFF state of the trigger switch 9 has not continued for the mode determination period, the CPU 23a ends the power-saving mode process.

By contrast, if the OFF state of the trigger switch 9 has continued for the mode determination period, the CPU 23a shifts to a sleep mode in S420. Upon shifting to the sleep mode, the CPU 23a turns OFF the switching element Q9. This results in interruption of supply of the power-supply voltage Vcc to the motor driver 21 and to the gate driver 22.

Then, in S430, the CPU 23a determines whether the trigger switch 9 is in the ON state. Here, if the trigger switch 9 is in the OFF state, the CPU 23a repeats the procedure of S430, thus waiting until the trigger switch 9 enters the ON state.

Upon the trigger switch 9 entering the ON state, the CPU 23a wakes up and shifts to a normal operation mode in S440, and ends the power-saving mode process. Upon shifting to the normal operation mode, the CPU 23a turns ON the switching element Q9. This results in restart of supply of the power-supply voltage Vcc to the motor driver 21 and to the gate driver 22.

Next, an explanation will be given of procedures of the motor control process performed by the CPU 23a in S60.

Figure 7:
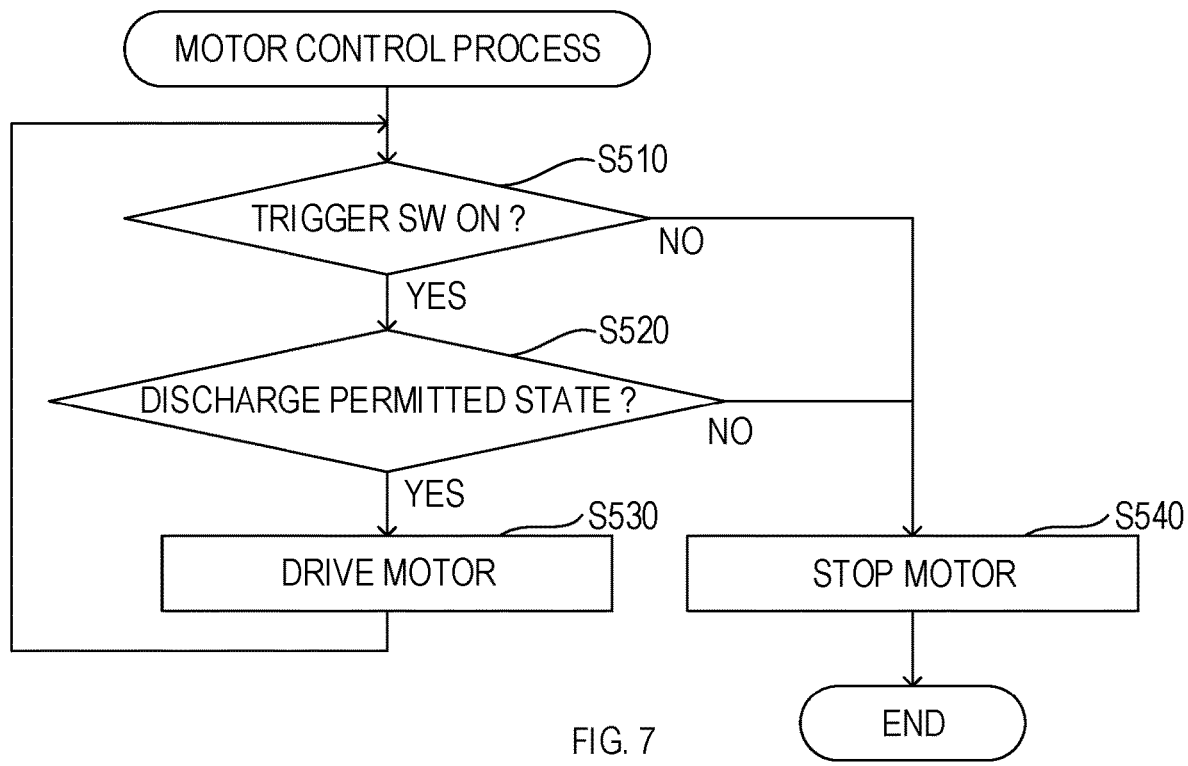
FIG. 7 is a flowchart showing a motor control process.

When performing the motor control process, as shown in FIG. 7, the CPU 23a first determines, in S510, whether the trigger switch 9 is in the ON state. Here, if the trigger switch 9 is in the OFF state, the CPU 23a shifts to S540. By contrast, if the trigger switch 9 is in the ON state, the CPU 23a determines, in S520, whether the battery 12 is in a discharge permitted state. Specifically, the CPU 23a determines that the battery 12 is in the discharge permitted state when detecting the discharge permission signal from the battery pack 10.

Here, if the battery 12 is in the discharge permitted state, the CPU 23a performs a motor drive process for driving the motor 11 in S530, and shifts to S510. By contrast, if the battery 12 is not in the discharge permitted state, the CPU 23a shifts to S540.

Upon shifting to S540, the CPU 23a performs a motor stop process for stopping drive of the motor 11, and ends the motor control process.

The thus-configured electric powered work machine 1 includes the motor 11 as a power source, and further includes the motor driver 21, the switching element Q7, the resistor R7, the resistors R1, R2, R3, R4, R5, and R6, and the control circuit 23. The motor 11 is a brushless motor.

The motor driver 21 includes the six switching elements Q1, Q2, Q3, Q4, Q5, and Q6, which are each arranged on the corresponding one of six first current paths between the battery 12 and the motor 11, and controls current flow to the motor 11 via the switching elements Q1 to Q6.

The first current path on which the switching element Q1 is arranged is a current path between the positive electrode of the battery 12 and the terminal U of the motor 11. The first current path on which the switching element Q3 is arranged is a current path between the positive electrode of the battery 12 and the terminal V of the motor 11. The first current path on which the switching element Q5 is arranged is a current path between the positive electrode of the battery 12 and the terminal W of the motor 11. The first current path on which the switching element Q2 is arranged is a current path between the negative electrode of the battery 12 and the terminal U of the motor 11. The first current path on which the switching element Q4 is arranged is a current path between the negative electrode of the battery 12 and the terminal V of the motor 11. The first current path on which the switching element Q6 is arranged is a current path between the negative electrode of the battery 12 and the terminal W of the motor 11.

The switching element Q7 is arranged on a second current path between the battery 12 and the motor driver 21. The resistor R7 is connected in parallel to the switching element Q7.

The resistors R1, R2, R3, R4, R5, and R6 are connected to the motor driver 21 in such a state that electrical conduction is possible between a positive side and a negative side of the battery 12 in the motor driver 21 in a case where all of the switching elements Q1 to Q6 in the motor driver 21 are OFF.

The control circuit 23 turns OFF the switching element Q7 and all of the switching elements Q1 to Q6, and determines whether at least one of "the switching elements Q1 to Q6 and the switching element Q7" is short-circuited based on the connection-point voltage at the connection point Pc between the switching element Q7 and the motor driver 21.

Specifically, the resistors R1, R3, and R5 are respectively connected in parallel to the switching elements Q1, Q3, and Q5, and the resistors R2, R4, and R6 are respectively connected in parallel to the switching elements Q2, Q4, and Q6. From among the switching elements Q1 to Q6, the switching elements Q1, Q3, and Q5 are arranged on the first current paths between the motor 11 and the positive electrode of the battery 12. From among the switching elements Q1 to Q6, the switching elements Q2, Q4, and Q6 are arranged on the first current paths between the motor 11 and the negative electrode of the battery 12.

In this way, in the electric powered work machine 1, the resistors R1 to R6 are connected to the motor driver 21 in such a state that electrical conduction is possible between the positive side and the negative side of the battery 12 in the motor driver 21. Thus, if at least one of the switching elements Q1 to Q6 is short-circuited in the motor driver 21, the connection-point voltage changes. On the other hand, the resistor R7 is connected in parallel to the switching element Q7. Thus, if the switching element Q7 is short-circuited, the connection-point voltage changes. Further, the connection-point voltage differs between the case in which at least one of the switching elements Q1 to Q6 is short-circuited and the case in which the switching element Q7 is short-circuited.

This makes it possible, in the electric powered work machine 1, to detect whether at least one of the switching elements Q1 to Q6 is short-circuited and whether the switching element Q7 is short-circuited.

The control circuit 23 determines that at least one of the switching elements Q1 to Q6 is short-circuited when the connection-point voltage is smaller than or equal to a fault determination voltage (($1/3$)×Vb in the present embodiment), which is set in advance so as to indicate the connection-point voltage at the time of occurrence of a short-circuit fault in one of the switching elements Q1 to Q6. This makes it possible, in the electric powered work machine 1, to determine whether at least one of the switching elements Q1 to Q6 is short-circuited by a simple method in which the connection-point voltage is compared with the fault determination voltage.

The control circuit 23 determines that the switching element Q7 is short-circuited when the connection-point voltage is larger than or equal to a power-source-side fault determination voltage (Vb in the present embodiment), which is set in advance so as to indicate the connection-point voltage at the time of occurrence of a short-circuit fault in the switching element Q7. This makes it possible, in the electric powered work machine 1, to determine whether the switching element Q7 is short-circuited by a simple method in which the connection-point voltage is compared with the power-source-side fault determination voltage.

When the control circuit 23 determines that at least one of "the switching elements Q1 to Q6 and the switching element Q7" is short-circuited, the light emitting diode 33 in the electric powered work machine 1 notifies accordingly. In the cases of determining that at least one of "the switching elements Q1 to Q6 and the switching element Q7" is short-circuited, if the trigger switch 9 to be operated to activate the electric powered work machine 1 is in the ON state, the control circuit 23 turns OFF all of the switching elements Q1 to Q6 and the switching element Q7. This makes it possible, in the electric powered work machine 1, when at least one of "the switching elements Q1 to Q6 and the switching element Q7" is short-circuited, to make the user of the electric powered work machine 1 aware of such a situation. In addition, in the electric powered work machine 1, when at least one of "the switching elements Q1 to Q6 and the switching element Q7" is short-circuited, it is possible to inhibit occurrence of a situation in which a short-circuit current flows between the positive electrode and the negative electrode of the battery 12.

The switching element Q8 is connected in series to the resistor R7 and also connected in parallel to the switching element Q7. When the control circuit 23 starts a fault determination, the control circuit 23 turns ON the switching element Q8. This makes it possible, in the electric powered work machine 1, not to allow a current to flow through the resistor R7 except when the control circuit 23 performs the fault determination, thus reducing power consumption in the electric powered work machine 1.

The resistance value of the resistor R7 and the resistance value of each of the resistors R1 to R6 are equal to each other. This makes it possible, in the electric powered work machine 1, to facilitate calculation of the connection-point voltage in the case where at least one of "the switching elements Q1 to Q6 and the switching element Q7" is short-circuited.

The control circuit 23 prohibits the control circuit 23 from performing the fault determination when the motor 11 is rotating. This makes it possible, in the electric powered work machine 1, to inhibit occurrence of a situation in which the control circuit 23 performs the fault determination when an induced voltage resulting from the inertial rotation of the motor 11 is affecting the connection-point voltage, thus improving accuracy of the fault determination by the control circuit 23.

In the above-described embodiment, the motor 11 corresponds to a brushless motor, the motor driver 21 corresponds to an inverter circuit, the switching elements Q1 to Q6 correspond to semiconductor switching elements, and the switching element Q7 corresponds to a power-source-side switching element.

The battery 12 corresponds to a direct-current power source, the resistor R7 corresponds to a power-source-side resistor, the resistors R1 to R6 correspond to at least one circuit-side resistor, and S110 to S230 correspond to procedures as a fault determiner.

The switching elements Q1, Q3, and Q5 correspond to high-side switching elements, the switching elements Q2, Q4, and Q6 correspond to low-side switching elements, the light emitting diode 33 corresponds to a short-circuit notifier, and S80 corresponds to a procedure as a power-supply interrupter.

The switching element Q8 corresponds to a parallel switching element, S130 corresponds to a procedure as an at-determination controller, and S120 corresponds to a procedure as a prohibitor.

Second Embodiment

A second embodiment of the present disclosure will be described below with reference to the drawings. In the second embodiment, differences from the first embodiment will be described. The same reference numerals are assigned to common configurations.

The electric powered work machine 1 of the second embodiment differs from that of the first embodiment in that the electrical configuration of the electric powered work machine 1 is changed and in that the fault diagnosis process is changed.

Figure 8:
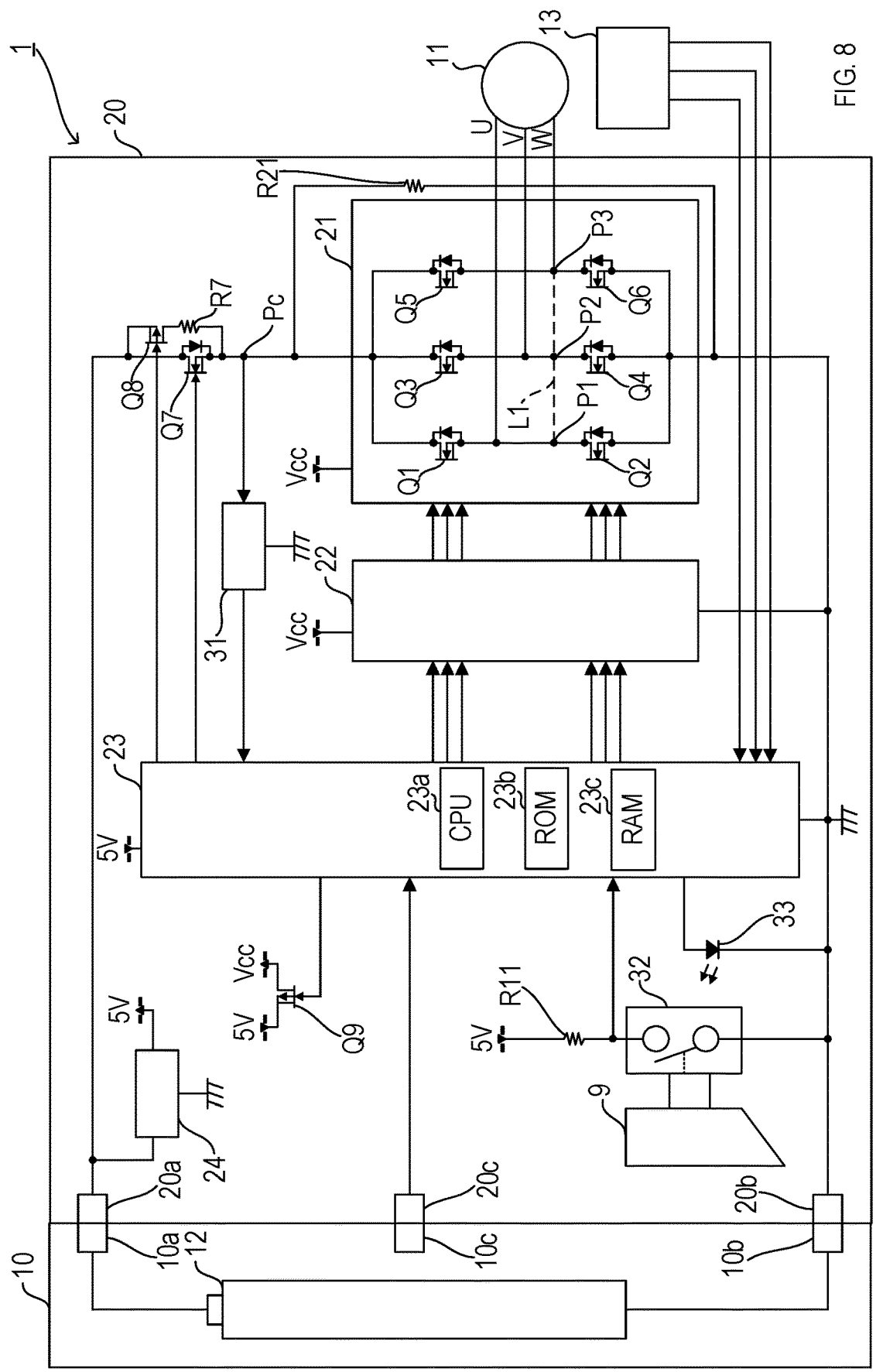
FIG. 8 is a perspective view showing an electrical configuration of an electric powered work machine of a second embodiment.

As shown in FIG. 8, the electric powered work machine 1 of the second embodiment is different from that of the first embodiment in that the resistors R1, R2, R3, R4, R5, and R6 are omitted and in that a resistor R21 is added.

The resistor R21 is connected in parallel to the motor driver 21. Specifically, one end of the resistor R21 is connected to the connection point Pc, and the other end of the resistor R21 is grounded.

Here, an explanation will be given of a method for detecting a short-circuit fault in the switching elements Q1 to Q7 in the second embodiment.

First, assume that drain-to-source resistances of the switching elements Q1 to Q7 at the time when the switching elements Q1 to Q7 are OFF are sufficiently larger than resistances of the resistor R7 and the resistor R21, and can be ignored.

Also, assume that resistance in each winding of the motor 11 is sufficiently smaller than those of the resistor R7 and the resistor R21, and can be ignored. In such a case, the motor driver 21 can be deemed to equivalently have a wiring in which sources of the switching elements Q1, Q3, and Q5 are connected to drains of the switching elements Q2, Q4, and Q6, respectively, as shown with a broken line L1 and points P1, P2, and P3.

Further, assume that the resistor R7 and the resistor R21 have the same resistance value. In such conditions, a connection-point voltage at the time when the switching elements Q1 to Q7 are OFF (hereinafter referred to as an OFF-state connection-point voltage) is calculated to be $(\frac{1}{2}) \times Vb$, if no short circuit is occurring in the switching elements Q1 to Q7.

The OFF-state connection-point voltage in a case where short circuit is occurring in the switching element Q7 is calculated to be Vb.

The connection-point voltage in a case where short circuit is occurring in at least one of the switching elements Q1, Q3, and Q5 and also where at least one of the switching elements Q2, Q4, and Q6 is turned ON is calculated to be 0 V.

The connection-point voltage in a case where short circuit is occurring in at least one of the switching elements Q2, Q4, and Q6 and also where at least one of the switching elements Q1, Q3, and Q5 is turned ON is calculated to be 0 V.

Accordingly, if the connection-point voltage is equal to Vb or 0 V, it can be determined that short circuit is occurring in at least one of the switching elements Q1 to Q7.

Next, an explanation will be given of procedures of a fault diagnosis process of the second embodiment.

Figure 9:
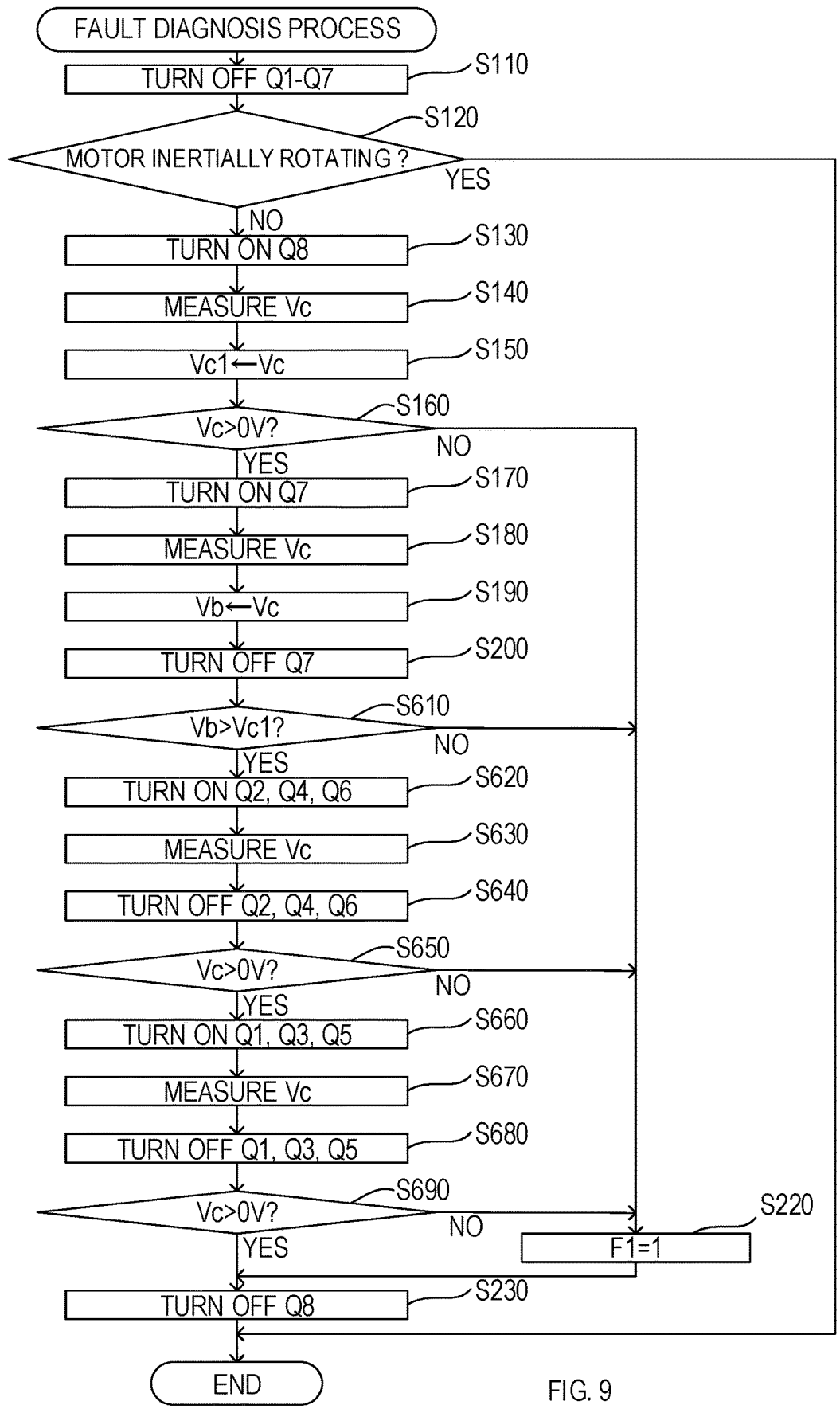
FIG. 9 is a flowchart showing a fault diagnosis process of the second embodiment.

As shown in FIG. 9, the fault diagnosis process of the second embodiment differs from that of the first embodiment in that S210 is omitted and in that S610 to S690 are added.

Specifically, upon completion of the procedure of S200, the CPU 23a determines, in S610, whether the value stored in the connection-point voltage Vc1 is smaller than the value stored in the battery voltage Vb. Here, if the value stored in the connection-point voltage Vc1 is larger than or equal to the value stored in the battery voltage Vb, the CPU 23a shifts to S220.

By contrast, if the value stored in the connection-point voltage Vc1 is smaller than the value stored in the battery voltage Vb, the CPU 23a turns ON the switching elements Q2, Q4, and Q6 in S620. Then, in S630, the CPU 23a measures the connection-point voltage based on the divided voltage from the voltage-dividing circuit 31, and stores the value of the measured voltage in the connection-point voltage Vc. Further, in S640, the CPU 23a turns OFF the switching elements Q2, Q4, and Q6.

Subsequently, in S650, the CPU 23a determines whether the connection-point voltage Vc is larger than 0 V. Here, if the connection-point voltage Vc is smaller than or equal to 0 V, the CPU 23a shifts to S220. By contrast, if the connection-point voltage Vc is larger than 0 V, the CPU 23a turns ON the switching elements Q1, Q3, and Q5 in S660. Then, in S670, the CPU 23a measures the connection-point voltage based on the divided voltage from the voltage-dividing circuit 31, and stores the value of the measured voltage in the connection-point voltage Vc. Further, in S680, the CPU 23a turns OFF the switching elements Q1, Q3, and Q5.

Next, in S690, the CPU 23a determines whether the connection-point voltage Vc is larger than 0 V. Here, if the connection-point voltage Vc is smaller than or equal to 0 V, the CPU 23a shifts to S220. By contrast, if the connection-point voltage Vc is larger than 0 V, the CPU 23a shifts to S230.

The thus-configured electric powered work machine 1 includes the motor 11 as a power source, and further includes the motor driver 21, the switching element Q7, the resistor R7, the resistor R21, and the control circuit 23.

The resistor R21 is connected to the motor driver 21 in such a state that electrical conduction is possible between the positive side and the negative side of the battery 12 in the motor driver 21 in a case where all of the switching elements Q1 to Q6 in the motor driver 21 are OFF. Specifically, the resistor R21 is connected in parallel to the motor driver 21.

The control circuit 23 turns OFF all of the switching element Q7 and the switching elements Q1 to Q6, and determines whether at least one of "the switching elements Q1 to Q6 and the switching element Q7" is short-circuited based on the connection-point voltage at the connection point Pc between the switching element Q7 and the motor driver 21.

In this way, in the electric powered work machine 1, the resistor R21 is connected to the motor driver 21 in such a state that electrical conduction is possible between the positive side and the negative side of the battery 12 in the motor driver 21. Thus, if at least one of the switching elements Q1 to Q6 is short-circuited in the motor driver 21, the connection-point voltage changes. On the other hand, the resistor R7 is connected in parallel to the switching element Q7. Thus, if the switching element Q7 is short-circuited, the connection-point voltage changes. Further, the connection-point voltage differs between the case in which at least one of the switching elements Q1 to Q6 is short-circuited and the case in which the switching element Q7 is short-circuited.

This makes it possible, in the electric powered work machine 1, to detect whether at least one of the switching elements Q1 to Q6 is short-circuited and whether the switching element Q7 is short-circuited.

In the above-described embodiment, the resistor R21 corresponds to at least one circuit-side resistor, and S110 to S200, S220, S230, and S610 to S690 correspond to procedures as a fault determiner.

Third Embodiment

A third embodiment of the present disclosure will be described below with reference to the drawings. In the third embodiment, differences from the first embodiment will be described. The same reference numerals are assigned to common configurations.

The electric powered work machine 1 of the third embodiment differs from that of the first embodiment in that the electrical configuration of the electric powered work machine 1 is changed and in that the fault diagnosis process is changed.

Figure 10:
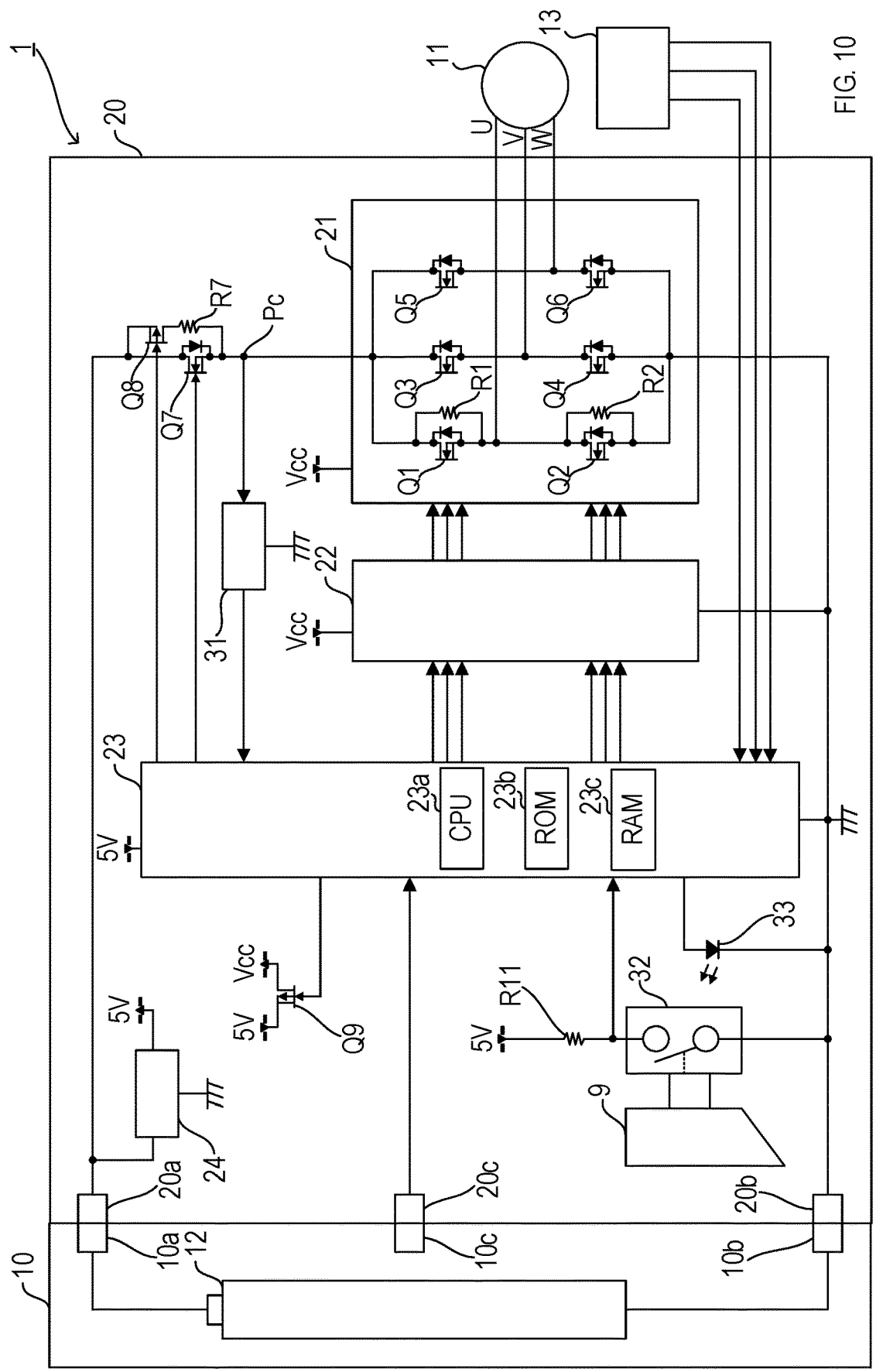
FIG. 10 is a perspective view showing an electrical configuration of an electric powered work machine of a third embodiment.

As shown in FIG. 10, the electric powered work machine 1 of the third embodiment is different from that of the first embodiment in that the resistors R3, R4, R5, and R6 are omitted.

Here, an explanation will be given of a method for detecting a short-circuit fault in the switching elements Q1 to Q7 in the third embodiment.

First, assume that drain-to-source resistances of the switching elements Q1 to Q7 at the time when the switching elements Q1 to Q7 are OFF are sufficiently larger than resistances of the resistors R1, R2, and R7, and can be ignored.

Also, assume that resistance in each winding of the motor 11 is sufficiently smaller than those of the resistors R1, R2, and R7, and can be ignored. In such a case, as shown in FIG. 8, the motor driver 21 can be deemed to equivalently have a wiring in which the sources of the switching elements Q1, Q3, and Q5 are connected to the drains of the switching elements Q2, Q4, and Q6, respectively, as shown with the broken line L1 and the points P1, P2, and P3.

Figure 11:
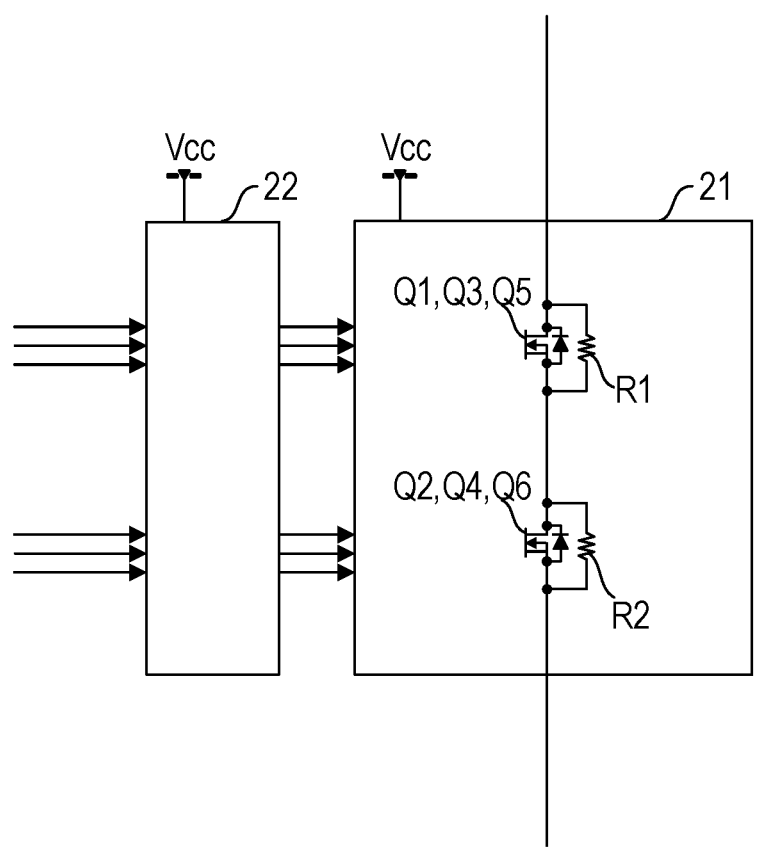
FIG. 11 is a diagram showing an equivalent circuit of a motor driver of the third embodiment.

Further, as described above, the drain-to-source resistances of the switching elements Q1 to Q7 at the time when the switching elements Q1 to Q7 are OFF are sufficiently larger than the resistances of the resistors R1, R2, and R7. Thus, as shown in FIG. 11, the motor driver 21 can be deemed to be equivalently a circuit in which the switching element Q1, the switching element Q3, and the switching element Q5 are connected in parallel to one another, the switching element Q2, the switching element Q4, and the switching element Q6 are connected in parallel to one another, the parallel-connected switching elements Q1, Q3, and Q5 and the parallel-connected switching elements Q2, Q4, and Q6 are connected in series to each other, the resistor R1 is further connected in parallel to the parallel-connected switching elements Q1, Q3, and Q5, and the resistor R2 is further connected in parallel to the parallel-connected switching elements Q2, Q4, and Q6.

Further, assume that the resistor R7 and the resistors R1 and R2 have the same resistance value. In such conditions, a connection-point voltage at the time when the switching elements Q1 to Q7 are OFF (hereinafter referred to as an OFF-state connection-point voltage) is calculated to be $(2/3) \times Vb$, if no short circuit is occurring in the switching elements Q1 to Q7.

The OFF-state connection-point voltage in a case where short circuit is occurring in the switching element Q7 is calculated to be Vb.

The connection-point voltage in a case where short circuit is occurring in any one of the switching elements Q1 to Q6 is calculated to be $(1/2) \times Vb$.

Accordingly, if the connection-point voltage is equal to Vb or is smaller than or equal to $(1/2) \times Vb$, it can be determined that short circuit is occurring in at least one of the switching elements Q1 to Q7.

Next, an explanation will be given of procedures of a fault diagnosis process of the third embodiment.

Figure 12:
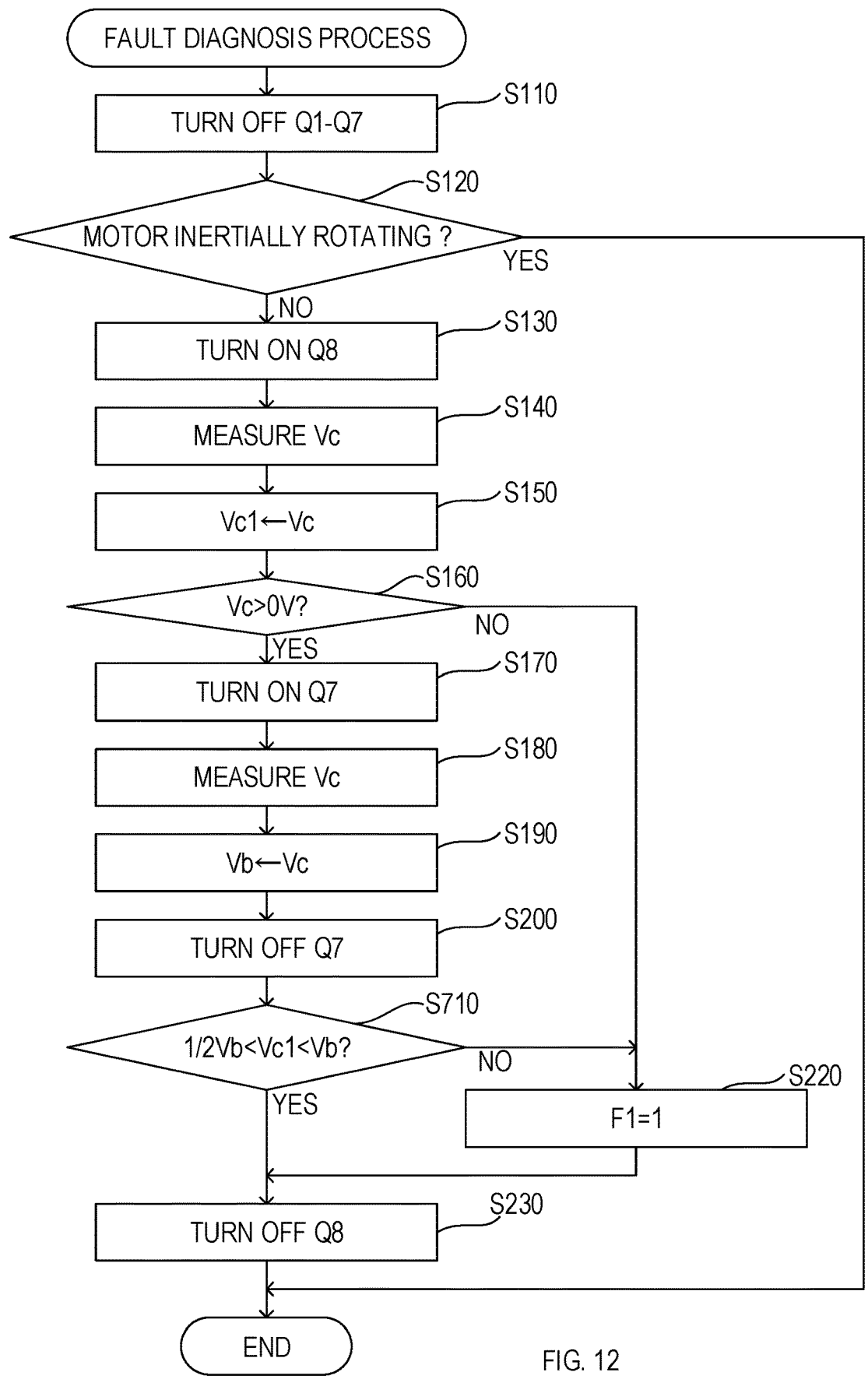
FIG. 12 is a flowchart showing a fault diagnosis process of the third embodiment.

As shown in FIG. 12, the fault diagnosis process of the third embodiment differs from that of the first embodiment in that S210 is omitted and in that S710 is added.

Specifically, upon completion of the procedure of S200, the CPU 23a determines, in S710, whether the value stored in the connection-point voltage Vc1 is larger than one-half of the value stored in the battery voltage Vb and also smaller than the value stored in the battery voltage Vb. That is, the CPU 23a determines whether $(1/2) \times Vb < Vc1 < Vb$ is satisfied.

Here, if the value stored in the connection-point voltage Vc1 is smaller than or equal to one-half of the value stored in the battery voltage Vb, or larger than or equal to the value stored in the battery voltage Vb, the CPU 23a shifts to S220.

By contrast, if the value stored in the connection-point voltage Vc1 is larger than one-half of the value stored in the battery voltage Vb and also smaller than the value stored in the battery voltage Vb, the CPU 23a shifts to S230.

The thus-configured electric powered work machine 1 includes the motor 11 as a power source, and further includes the motor driver 21, the switching element Q7, the resistor R7, the resistors R1 and R2, and the control circuit 23.

The resistors R1 and R2 are connected to the motor driver 21 in such a state that electrical conduction is possible between the positive side and the negative side of the battery 12 in the motor driver 21 in a case where all of the switching elements Q1 to Q6 in the motor driver 21 are OFF.

The control circuit 23 turns OFF all of the switching element Q7 and the switching elements Q1 to Q6, and determines whether at least one of "the switching elements Q1 to Q6 and the switching element Q7" is short-circuited based on the connection-point voltage at the connection point Pc between the switching element Q7 and the motor driver 21.

Specifically, the resistor R1 is connected in parallel to the switching element Q1, and the resistor R2 is connected in parallel to the switching element Q2. The switching element Q1 is arranged on the first current path between the motor 11 and the positive electrode of the battery 12. The switching element Q2 is arranged on the first current path between the motor 11 and the negative electrode of the battery 12.

In this way, in the electric powered work machine 1, the resistors R1 and R2 are connected to the motor driver 21 in such a state that electrical conduction is possible between the positive side and the negative side of the battery 12 in the motor driver 21. Thus, if at least one of the switching elements Q1 to Q6 is short-circuited in the motor driver 21, the connection-point voltage changes. On the other hand, the resistor R7 is connected in parallel to the switching element Q7. Thus, if the switching element Q7 is short-circuited, the connection-point voltage changes. Further, the connection-point voltage differs between the case in which at least one of the switching elements Q1 to Q6 is short-circuited and the case in which the switching element Q7 is short-circuited.

This makes it possible, in the electric powered work machine 1, to detect whether at least one of the switching elements Q1 to Q6 is short-circuited and whether the switching element Q7 is short-circuited.

In the above-described embodiment, the resistors R1 and R2 correspond to at least one circuit-side resistor, and S110 to S200, S220, S230, and S710 correspond to procedures as a fault determiner.

Although the embodiments of the present disclosure have been described so far, the present disclosure may be practiced in various modified forms without being limited to the above-described embodiments.

For example, the above-described embodiments show the mode in which the switching element Q7 is arranged on the current path between the positive electrode of the battery 12 and the motor driver 21; however, the switching element Q7 may be arranged on a current path between the negative electrode of the battery 12 and the motor driver 21.

Further, the above-described first embodiment shows the mode in which it is determined that short circuit is occurring in at least one of the switching elements Q1 to Q6 if $Vc1 \leq (1/3) \times Vb$ is satisfied (i.e., the mode in which the fault determination voltage is $(1/3) \times Vb$). However, the fault determination voltage may be set to a value between: a normal-state lowest value, which is the lowest value of the connection-point voltage at the time when the switching elements Q1 to Q7 are each in a normal state; and the value of the connection-point voltage at the time when one of the switching elements Q1 to Q6 is short-circuited.

Figure 13:
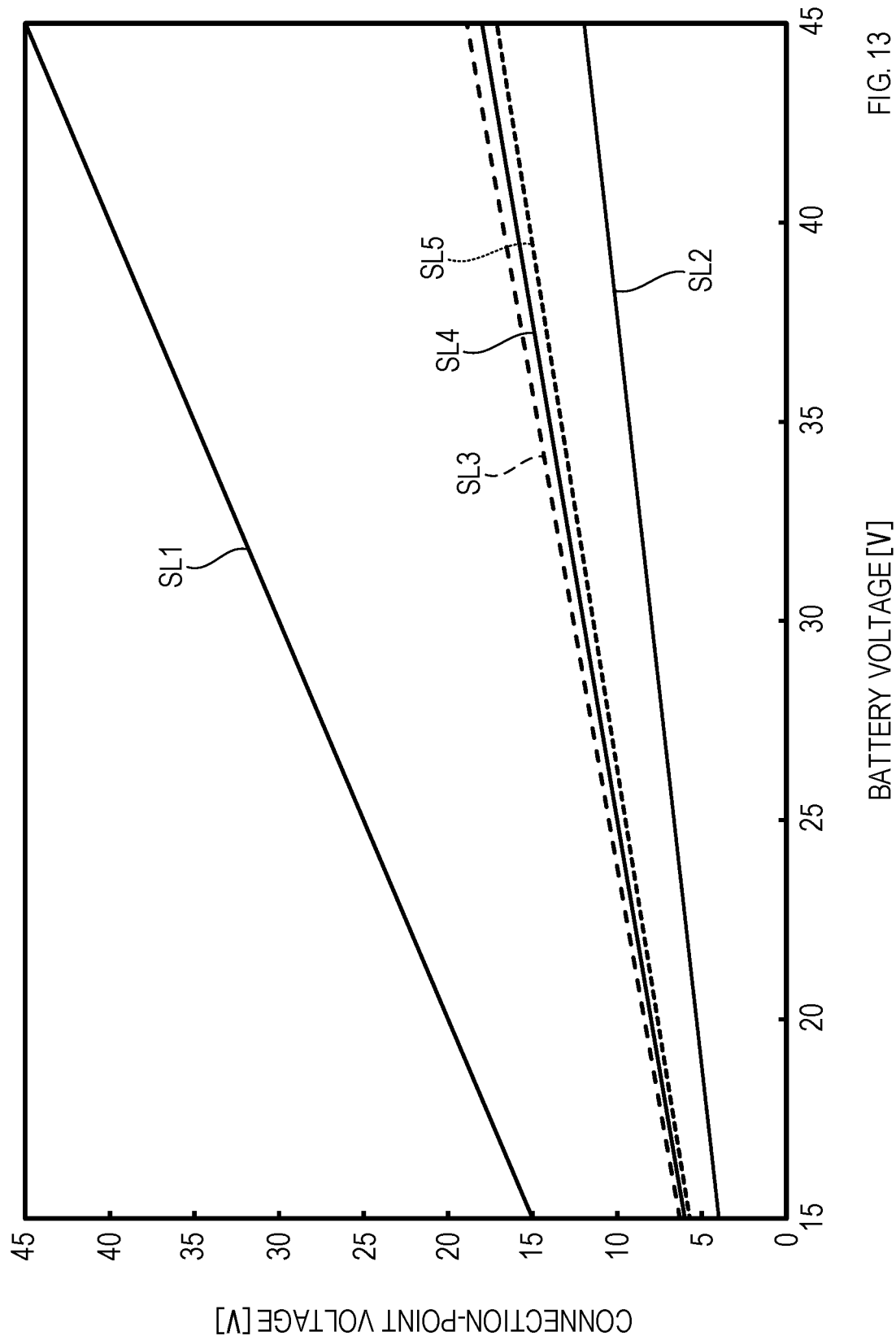
FIG. 13 is a graph showing a relationship between a connection-point voltage and a battery voltage.

FIG. 13 is a graph showing relationships between: the connection-point voltage at the time when the switching elements Q1 to Q7 are each in a normal state, the connection-point voltage at the time when one of the switching elements Q1 to Q6 is short-circuited, and the connection-point voltage at the time when the switching element Q7 is short-circuited; and the battery voltage.

A straight line SL1 in FIG. 13 shows the connection-point voltage at the time when the switching element Q7 is short-circuited. A straight line SL2 in FIG. 13 shows the connection-point voltage at the time when one of the switching elements Q1 to Q6 is short-circuited. A straight line SL3 in FIG. 13 shows the connection-point voltage at the time when the switching elements Q1 to Q6 are low in temperature and the switching element Q7 is high in temperature and also is in a normal state. A straight line SL4 in FIG. 13 shows the connection-point voltage at the time when the switching elements Q1 to Q7 are normal in temperature and also are each in a normal state. A straight line SL5 in FIG. 13 shows the connection-point voltage at the time when the switching elements Q1 to Q6 are high in temperature, and the switching element Q7 is low in temperature and also is in a normal state.

As shown by the straight lines SL3, SL4, and SL5 in FIG. 13, the connection-point voltage at the time when the switching elements Q1 to Q7 are each in a normal state varies depending on the temperature of the switching elements Q1 to Q7. The connection-point voltage becomes higher as the temperatures of the switching elements Q1 to Q6 become lower or as the temperature of the switching element Q7 becomes higher.

Thus, the fault determination voltage may be set to a value between the value of the connection-point voltage at the highest temperature of the switching elements Q1 to Q6 and also at the lowest temperature of the switching element Q7, which are expected during use of the electric powered work machine 1 (hereinafter referred to as a normal-state lowest value) and the value of the connection-point voltage at the time when one of the switching elements Q1 to Q6 is short-circuited. This makes it possible, in the electric powered work machine 1, to inhibit occurrence of a situation in which it is determined that at least one of the switching elements Q1 to Q6 is short-circuited despite the fact that none of the switching elements Q1 to Q6 is short-circuited, thus improving accuracy of the fault determination by the control circuit 23.

Even when the switching elements Q1 to Q7 are OFF, a minute leakage current flows between the drains and the sources of the switching elements Q1 to Q7, and this leakage current increases with the temperature rise of the switching elements Q1 to Q7. That is, the drain-to-source resistances at the time when the switching elements Q1 to Q7 are OFF decrease with the temperature rise of the switching elements Q1 to Q7.

In the case where the switching elements Q1 to Q7 are short-circuited, the drain-to-source resistances do not necessarily become $0\Omega$ and have a certain degree of impedance. Thus, in order to improve accuracy of the fault diagnosis, it is desirable to set the fault determination voltage to be close to a normal range.

Here, since it is necessary to avoid a situation in which determination of a short-circuit fault is made despite the fact that the switching elements Q1 to Q7 are each in a normal state, it is necessary to calculate the normal range with variations included and to set the fault determination voltage to be out of this normal range.

The biggest factor that causes variations in the circuit configuration in the above-described first embodiment is the temperatures of the switching elements Q1 to Q7. Review on the temperature conditions for the normal-state lowest value founds that the conditions for the widest variations are when the temperature of the motor driver 21 arranged closer to the ground is high (i.e., the drain-to-source resistance is lowest) and the temperature of the switching element Q7 closer to the battery 12 is low (i.e., the drain-to-source resistance is highest). Thus, the connection-point voltage under such conditions may be set for the normal-state lowest value. This makes it possible, in the electric powered work machine 1, to inhibit occurrence of the situation in which it is determined that at least one of the switching elements Q1 to Q6 is short-circuited despite the fact that none of the switching elements Q1 to Q6 is short-circuited, thus further improving accuracy of the fault determination by the control circuit 23. In this case, the switching element Q7 corresponds to a positive-side element, and the motor driver 21 corresponds to a negative-side element.

The technique of the present disclosure can be applied to various electric powered work machines, such as an electric hammer, an electric hammer drill, an electric drill, an electric screwdriver, an electric wrench, an electric grinder, an electric circular saw, an electric reciprocating saw, an electric jigsaw, an electric cutter, an electric chain saw, an electric planar, an electric nailer (including a tacker), an electric hedge trimmer, an electric lawn mower, an electric lawn trimmer, an electric grass cutter, an electric cleaner, an electric blower, an electric sprayer, an electric spreader, and an electric dust collector.

Two or more functions of a single element in the above-described embodiments may be performed by two or more elements, and a single function of a single element may be performed by two or more elements. Two or more functions of two or more elements may be performed by a single element, and a single function performed by two or more elements may be performed by a single element. Part of a configuration in the above-described embodiments may be omitted. At least part of a configuration in the above-described embodiments may be added to or replace another configuration in the above-described embodiments.

In addition to the above-described electric powered work machine 1, the present disclosure may also be implemented in various forms, such as a program for causing a computer to function as the control unit 20, a non-transitory tangible storage medium, such as a semiconductor memory, in which this program is stored, and a fault diagnosis method.

The invention claimed is:

1. An electric powered work machine comprising:
a motor;
a motor driver configured to control current flow to the motor, the motor driver including:
first semiconductor switching elements arranged on corresponding power-supply lines that connect terminals of the motor and a positive electrode of a battery, and second semiconductor switching elements arranged on corresponding ground lines that connect the terminals of the motor and a negative electrode of the battery;
a control circuit including a microcomputer;
a gate driver configured to turn ON or OFF each of the first semiconductor switching elements and the second semiconductor switching elements of the motor driver in accordance with a control signal from the control circuit;
a power-source-side semiconductor switching element having a drain connected to a power-supply terminal of the battery, a source connected to the motor driver, and a gate connected to the control circuit;
a power-supply-controlling semiconductor switching element connected in parallel to the power-source-side semiconductor switching element;
a power-source-side resistor having one end connected to a drain of the power-supply-controlling semiconductor switching element and the other end connected to a source of the power-source-side semiconductor switching element; and
a voltage-dividing circuit configured to output, to the control circuit, a divided voltage obtained by dividing a connection-point voltage at a connection point between the power-source-side semiconductor switching element and the motor driver,
the control circuit including a fault determiner configured to turn OFF all of the first semiconductor switching elements, the second semiconductor switching elements, and the power-source-side semiconductor switching element to determine whether at least one of "the first semiconductor switching elements, the second semiconductor switching elements, and the power-source-side semiconductor switching element" is short-circuited based on the connection-point voltage at the connection point between the power-source-side semiconductor switching element and the motor driver.

2. An electric powered work machine including a brushless motor as a power source, the electric powered work machine comprising:
an inverter circuit including semiconductor switching elements arranged on corresponding first current paths between a direct-current power source and the brushless motor, the inverter circuit being configured to control current flow to the brushless motor via the semiconductor switching elements;
a power-source-side switching element arranged on a second current path between the direct-current power source and the inverter circuit;
a power-source-side resistor connected in parallel to the power-source-side switching element;
at least one circuit-side resistor connected to the inverter circuit in such a state that electrical conduction is possible between a positive side and a negative side of the direct-current power source in the inverter circuit in a case where all of the semiconductor switching elements in the inverter circuit are OFF; and
a fault determiner configured to turn OFF the power-source-side switching element and all of the semiconductor switching elements and to determine whether at least one of "the semiconductor switching elements and the power-source-side switching element" is short-circuited based on a connection-point voltage at a connection point between the power-source-side switching element and the inverter circuit.

3. The electric powered work machine according to claim 2,
wherein, from among the semiconductor switching elements, the semiconductor switching elements arranged on the corresponding first current paths between the brushless motor and a positive electrode of the direct-current power source are high-side switching elements, and the semiconductor switching elements arranged on the corresponding first current paths between the brushless motor and a negative electrode of the direct-current power source are low-side switching elements, and
wherein the at least one circuit-side resistor is connected in parallel to at least one of the high-side switching elements, and is connected in parallel to at least one of the low-side switching elements.

4. The electric powered work machine according to claim 2,
wherein the fault determiner is configured to determine that at least one of the semiconductor switching elements is short-circuited if the connection-point voltage is smaller than or equal to a fault determination voltage, which is set in advance so as to indicate the connection-point voltage at a time of occurrence of a short-circuit fault in one of the semiconductor switching elements.

5. The electric powered work machine according to claim 2,
wherein the fault determiner is configured to determine that the power-source-side switching element is short-circuited if the connection-point voltage is larger than or equal to a power-source-side fault determination voltage, which is set in advance so as to indicate the connection-point voltage at a time of occurrence of a short-circuit fault in the power-source-side switching element.

6. The electric powered work machine according to claim 2, further comprising:
a short-circuit notifier configured, if the fault determiner determines that at least one of "the semiconductor switching elements and the power-source-side switching element" is short-circuited, to notify accordingly; and
a power-supply interrupter configured to turn OFF all of the semiconductor switching elements and the power-source-side switching element if an operation switch to be operated to activate the electric powered work machine is in an ON state in a case where the fault determiner determines that at least one of "the semiconductor switching elements and the power-source-side switching element" is short-circuited.

7. The electric powered work machine according to claim 2, further comprising:
a parallel switching element connected in series to the power-source-side resistor and also connected in parallel to the power-source-side switching element; and
an at-determination controller configured to turn ON the parallel switching element at a start of fault determination by the fault determiner.

8. The electric powered work machine according to claim 2,
wherein resistance values of the power-source-side resistor and of the at least one circuit-side resistor are equal to each other.

9. The electric powered work machine according to claim 2, further comprising:
a prohibitor configured to prohibit the fault determiner from performing fault determination during rotation of the brushless motor.

10. The electric powered work machine according to claim 4,
 wherein the fault determination voltage is set to a value between: a normal-state lowest value, which is a lowest value of the connection-point voltage in a case where all of the semiconductor switching elements and the power-source-side switching element are each in a normal state; and a value of the connection-point voltage in a case where one of the semiconductor switching elements is short-circuited.

11. The electric powered work machine according to claim 10,
 wherein, on a current path from a positive electrode of the direct-current power source to a negative electrode of the direct-current power source, from among the inverter circuit and the power-source-side switching element that are elements constituting the electric powered work machine, the element arranged closer to the positive electrode of the direct-current power source is a positive-side element, and the element arranged closer to the negative electrode of the direct-current power source is a negative-side element, and
 wherein the normal-state lowest value is a value in a case where a temperature of the negative-side element is higher than a temperature of the positive-side element.

* * * * *